United States Patent
Fang et al.

(10) Patent No.: US 9,966,881 B2
(45) Date of Patent: May 8, 2018

(54) BLUETOOTH MOTOR CONTROLLER, BRUSHLESS DIRECT CURRENT MOTOR, AND MULTI-MOTOR SYSTEM COMPRISING THE SAME

(71) Applicant: Zhongshan Broad-Ocean Motor Co., Ltd., Zhongshan (CN)

(72) Inventors: Qiang Fang, Zhongshan (CN); Wenqing Bian, Zhongshan (CN); Songfa Tang, Zhongshan (CN); Qingmei Jiao, Zhongshan (CN); Lijuan Li, Zhongshan (CN)

( * ) Notice: Subject to any disclaimer, the term of this patent is extended or adjusted under 35 U.S.C. 154(b) by 18 days.

(21) Appl. No.: 15/138,237

(22) Filed: Apr. 26, 2016

(65) Prior Publication Data
US 2017/0093310 A1    Mar. 30, 2017

(30) Foreign Application Priority Data
Sep. 30, 2015    (CN) .................... 2015 2 0776650 U

(51) Int. Cl.
*H02P 6/04*    (2016.01)
*H04W 4/00*    (2018.01)
*H02P 29/60*    (2016.01)

(52) U.S. Cl.
CPC ............... *H02P 6/04* (2013.01); *H02P 29/60* (2016.02); *H04W 4/008* (2013.01)

(58) Field of Classification Search
CPC .... A63H 30/04; G05D 1/0202; G05D 1/0011; E06B 9/32; G01S 1/02
USPC ........................................................ 318/16
See application file for complete search history.

(56) References Cited

U.S. PATENT DOCUMENTS

| | | | | |
|---|---|---|---|---|
| 8,226,374 | B2* | 7/2012 | Peterson | A61H 33/005 318/599 |
| 2013/0020973 | A1* | 1/2013 | Ohgushi | H02P 6/15 318/400.23 |
| 2013/0120107 | A1* | 5/2013 | Song | G05B 19/106 340/4.3 |
| 2013/0169200 | A1* | 7/2013 | Zhao | H02P 6/08 318/255 |
| 2014/0159648 | A1* | 6/2014 | Sadwick | H02M 1/4266 320/107 |
| 2014/0354194 | A1* | 12/2014 | Toba | H02P 5/74 318/16 |
| 2016/0007417 | A1* | 1/2016 | Gao | H05B 33/0815 315/219 |

* cited by examiner

*Primary Examiner* — Kawing Chan
*Assistant Examiner* — Bradley Brown
(74) *Attorney, Agent, or Firm* — Matthias Scholl, PC; Matthias Scholl

(57) ABSTRACT

A motor controller, including: a Bluetooth communication unit and a motor control unit. The Bluetooth communication unit includes: a power supply part, a Bluetooth module, and an interface circuit. The motor control unit includes an input port of a rotational speed adjusting signal. The power supply part supplies power to the Bluetooth module and the interface circuit. The Bluetooth module enables the motor control unit to communicate with an external device. The Bluetooth module inputs a PWM signal into the input port of the rotational speed adjusting signal of the motor control unit via the interface circuit.

21 Claims, 13 Drawing Sheets

BLUETOOTH MOTOR CONTROLLER, BRUSHLESS DIRECT CURRENT MOTOR, AND MULTI-MOTOR SYSTEM COMPRISING THE SAME

CROSS-REFERENCE TO RELATED APPLICATIONS

Pursuant to 35 U.S.C. § 119 and the Paris Convention Treaty, this application claims the benefit of Chinese Patent Application No. 201520776650.5 filed Sep. 30, 2015, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a Bluetooth motor controller, a brushless direct current (DC) motor, and a multi-motor system comprising the same.

Description of the Related Art

A typical brushless DC motor has the following problems: 1) the rotational speed of the brushless DC motor is regulated using an extra PWM generator, and the regulation mode is complex and involves high costs; 2) when there is a need for serial communication between the motor and an external smart device, a USB to serial port communication device must be installed, however, the device is often unstable and causes communication failure; and 3) the maintenance of the motor is laborious and time-consuming.

SUMMARY OF THE INVENTION

In view of the above-described problems, it is one objective of the invention to provide a Bluetooth motor controller that is convenient for the regulation of the rotational speed of the brushless DC motor.

It is another objective of the invention to provide a brushless DC motor that has fast and reliable communication capability.

It is still another objective of the invention to provide a multi-motor system that is able to quickly detect the operation faults and reduce the labor intensity and the maintenance cost.

To achieve the above objective, in accordance with one embodiment of the invention, there is provided a Bluetooth motor controller. The motor controller comprises: a Bluetooth communication unit and a motor control unit. The Bluetooth communication unit comprises: a power supply part, a Bluetooth module, and an interface circuit. The motor control unit comprises an input port of a rotational speed adjusting signal. The power supply part supplies power to the Bluetooth module and the interface circuit. The Bluetooth module enables the motor control unit to communicate with an external device. The Bluetooth module inputs a PWM signal into the input port of the rotational speed adjusting signal of the motor control unit via the interface circuit.

In a class of this embodiment, the Bluetooth communication unit further comprises: a microprocessor, and a PWM output control module. The microprocessor and the Bluetooth module are connected and communicate with each other. The microprocessor and the Bluetooth module each operate to output one path of independent PWM signal, respectively. One path of the independent PWM signal is selected and output to the interface circuit via the PWM output control module, and then sent to the input port of the rotational speed adjusting signal of the motor control unit via the interface circuit.

In a class of this embodiment, the PWM output control module comprises: a driving circuit and a switch. When the driving circuit is in the absence of a driving signal input, the PWM output control module outputs the PWM signal from the Bluetooth module. When the driving circuit is input with the driving signal, the driving circuit drives the switch to operate so as to drive the PWM output control module to output the PWM signal from the microprocessor.

In a class of this embodiment, duty ratios of both the PWM signal output from the Bluetooth module and the PWM signal output from the microprocessor are adjustable.

In a class of this embodiment, a frequency range of the PWM signal output from the Bluetooth module is smaller than a frequency range of the PWM signal output from the microprocessor. A frequency of the PWM signal output from the Bluetooth module is adjustable.

In a class of this embodiment, the switch adopts a relay.

In a class of this embodiment, the PWM output control module further comprises a dial switch operating to select a level voltage of the PWM signal output by the PWM output control module.

In a class of this embodiment, the power supply part is adapted to convert a +24 VDC power supplied from outside device into a +12 VDC power, a +5 VDC power, and a +3.3 VDC power and supply the powers to other parts of the Bluetooth communication unit, respectively.

In a class of this embodiment, the motor control unit comprises: a power circuit, a motor microprocessor, an operation parameter detecting unit, and a power inverter circuit. The power circuit supplies power for other circuits, the operation parameter detecting unit detects operation parameters of the motor and inputs the detected operation parameters into the motor microprocessor. The motor microprocessor controls the motor to operate via the power inverter unit.

In a class of this embodiment, the motor control unit further comprises a signal interface unit. The motor microprocessor and the interface circuit of the Bluetooth communication unit are connected and communicate with each other via the signal interface unit so as to establish a communication connection between the motor microprocessor and the external device via the Bluetooth module.

In a class of this embodiment, the interface circuit comprises a plurality of connector ports for connecting the interface circuit to the signal interface unit of the motor control unit. The connector ports comprise: a +5 V port, an RXD_M port, a TXD_M port, a GND port, a PWM_IN port, and an NTC port.

In a class of this embodiment, a thermistor is disposed in the motor controller for transmitting a detected temperature signal to the motor microprocessor. The temperature signal is processed and converted by the motor microprocessor and then input into the Bluetooth module via the interface circuit, and the temperature signal is then sent to an external smart mobile device.

In a class of this embodiment, the Bluetooth communication unit and the motor control unit are integrated on a circuit board.

In a class of this embodiment, the Bluetooth communication unit and the motor control unit are integrated on different circuit boards, in which, the Bluetooth communication unit is integrated on a daughter circuit board, the motor control unit is integrated on a mother circuit board, and the daughter circuit board and the mother circuit board are connected and communicate with each other.

In a class of this embodiment, the daughter circuit board further comprises a USB to serial port module and a USB interface. The USB to serial port module is connected to the Bluetooth module and is connected to the external smart mobile device or an external PC terminal via the USB interface.

In a class of this embodiment, the daughter circuit board further comprises a voltage stabilizer. The voltage stabilizer is connected to the USB interface. The external smart mobile device or the external PC terminal is adapted to supply power to other circuits of the daughter circuit board via the USB interface and the voltage stabilizer.

In accordance with another embodiment of the invention, there is provided a brushless DC motor comprising the above motor controller.

In accordance with still another embodiment of the invention, there is provided a multi-motor system comprising a plurality of the brushless direct current motors. The multiple brushless direct current motors communicate with each other via Bluetooth communication units.

Advantages of the Bluetooth motor controller, the brushless direct current motor, and the multi-motor system comprising the same according to embodiments of the invention are summarized as follows:

1) The power supply part supplies power to the Bluetooth module and the interface circuit. The Bluetooth module is adapted to establish communication connection with the external. The Bluetooth module inputs the PWM signal into the input port of the rotational speed adjusting signal of the motor control unit via the interface circuit. The structure is simple; the PWM signal input into the motor control unit is conveniently adjustable via the Bluetooth module. The PWM signal serves as the rotational speed adjusting signal of the motor, thus realizing the convenient rotational speed regulation of the brushless DC motor.

2) The duty ratio of the PWM signal can be adjusted by the Bluetooth module or the microprocessor, and the frequency of the PWM signal can be adjusted by the Bluetooth module. The adjusted PWM signal is selected by the PWM output control module, and sent to the motor control unit by the interface circuit. The operation is convenient, the efficiency is effectively improved, and non-necessary production cost is reduced.

3) Duty ratios of both the PWM signal output from the Bluetooth module and the PWM signal output from the microprocessor are adjustable. The frequency range of the PWM signal output from the Bluetooth module is smaller than the frequency range of the PWM signal output from the microprocessor. The frequency of the PWM signal output from the Bluetooth module is adjustable. PWM signals with different frequencies or different duty ratios can be obtained by regulating the Bluetooth module or the microprocessor, thereby satisfying the requirement of different motor controller on the PWM signal, and broadening the application range.

4) The switch adopts a relay which has a simple structure, low cost, and facilitates the market competitiveness of the products.

5) The PWM output control module further comprises the dial switch for selecting the level voltage of the PWM signal output by the PWM output control module, so that requirements of different motor control unit on the level voltage of the PWM signal can be satisfied, thus having broaden application range.

6) The thermistor is disposed in the motor controller for transmitting the detected temperature signal to the motor microprocessor. The temperature signal is processed and converted by the motor microprocessor and then input into the Bluetooth module via the interface circuit, and the temperature signal is then sent to the external smart mobile device. Thus, the structure is simple, and real-time temperature variation of the motor can be detected by the application program the external smart mobile device by users, the use is convenient, and occurrence of accidents can be effectively reduced.

7) The daughter circuit board further comprises the USB to serial port module and the USB interface. The USB to serial port module is connected to the Bluetooth module and is connected to the external smart mobile device or the external PC terminal via the USB interface. Thus, the fast and reliable communication is realized, and the stability and the reliability of the data transportation are ensured.

8) The daughter circuit board further comprises the low dropout voltage stabilizer. The low dropout voltage stabilizer is connected to the USB interface. The external smart mobile device or the external PC terminal is adapted to supply power to other circuits of the daughter circuit board via the USB interface and the low dropout voltage stabilizer. Thus, the power is supplied to the daughter circuit board by the external smart mobile device or the PC terminal, no additional power is needed, and the use is much convenient and reliable.

9) In the multi-motor system, the brushless DC motors establish communication connection via Bluetooth communication units, so that the fault can be quickly detected by the communication among the brushless DC motors, and the labor intensity of the technicians and maintenance cost can be reduced.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a Bluetooth motor controller, a brushless direct current motor, and a multi-motor system are described below. It should be noted that the following examples are intended to describe and not to limit the invention.

Example 1

Figure 1:
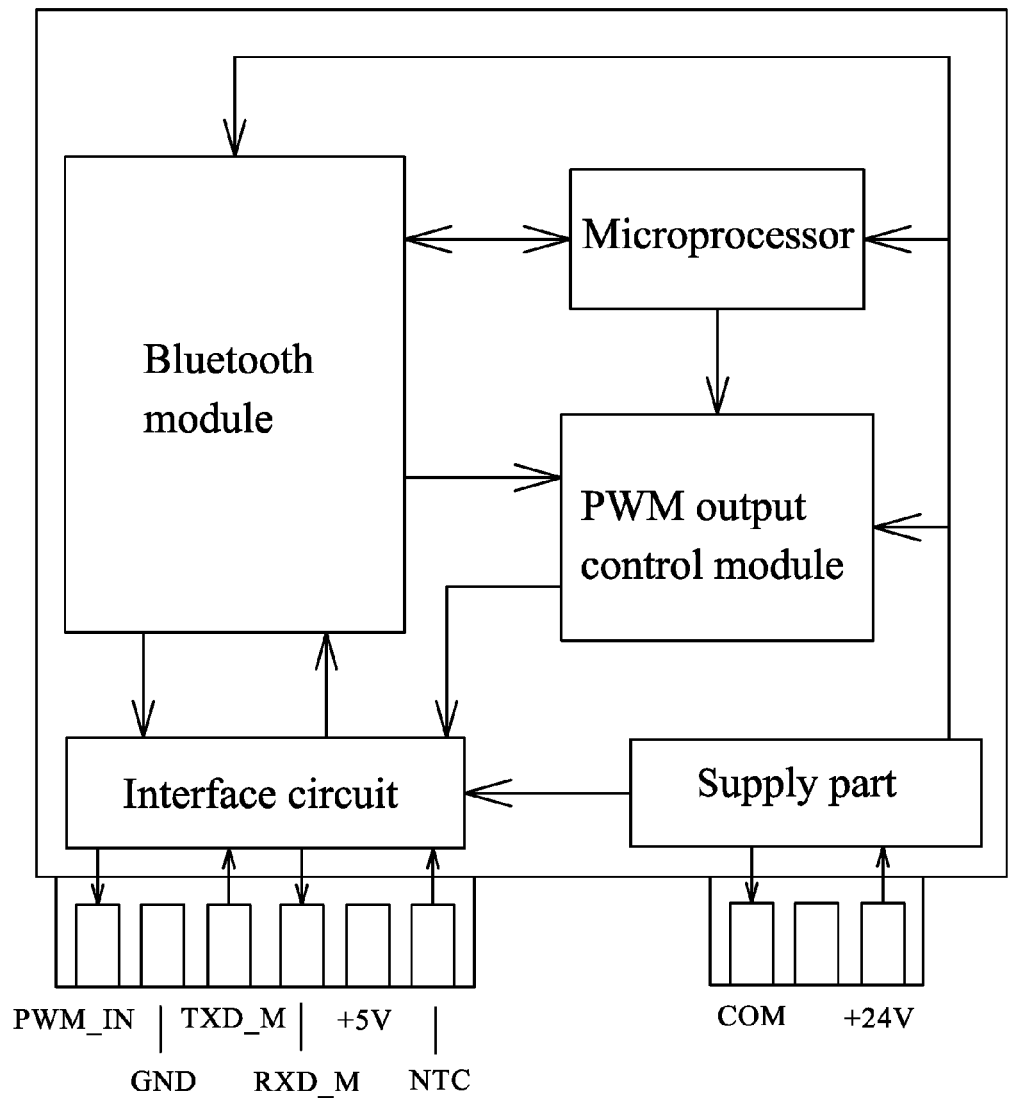
FIG. 1 is a schematic diagram of a Bluetooth communication unit in accordance with one embodiment of the invention.

As shown in FIG. 1, a Bluetooth motor controller comprises: a Bluetooth communication unit and a motor control unit.

The Bluetooth communication unit comprises: a power supply part, a Bluetooth module, and an interface circuit. The power supply part supplies power to the Bluetooth module and the interface circuit. The Bluetooth module is configured to establish a communication connection with an external device. A PWM signal, operating to regulate a rotational speed of a brushless DC motor, is input by the Bluetooth module into an input port of a rotational speed adjusting signal of the motor control unit via the interface circuit.

Figure 2:
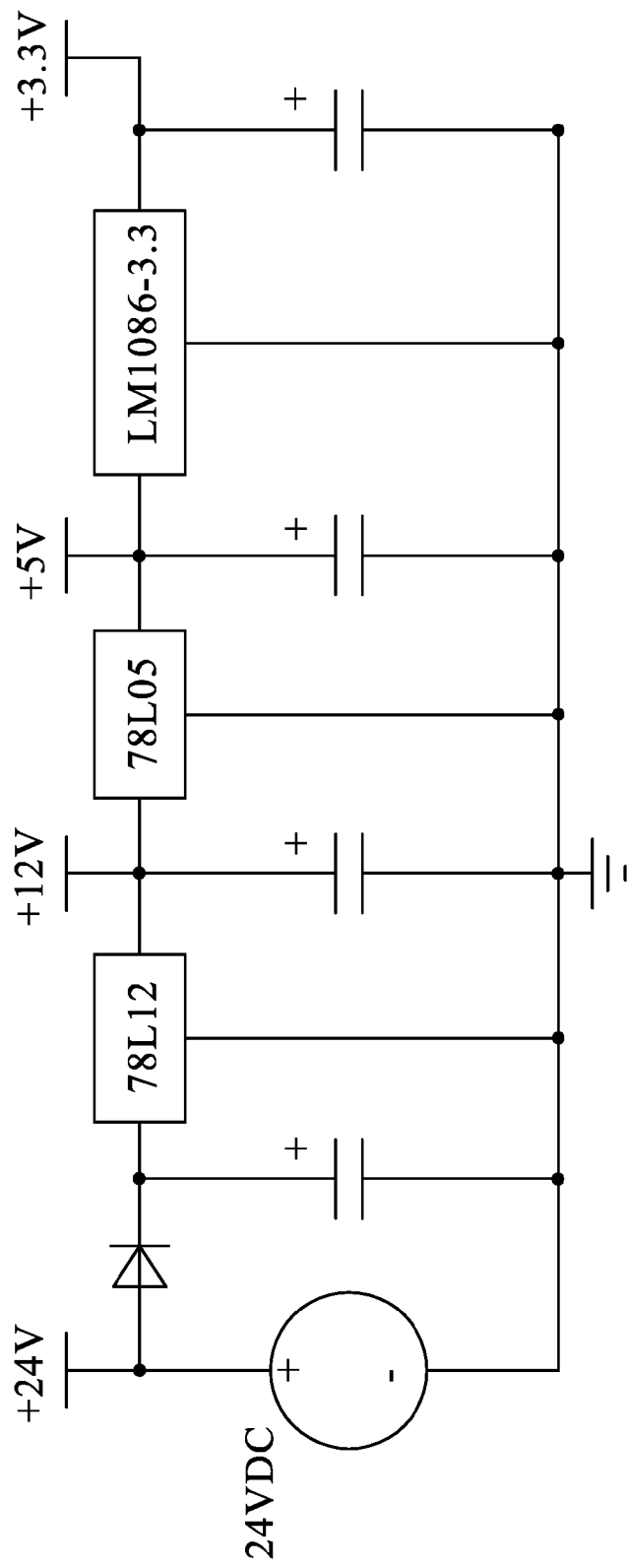
FIG. 2 is a circuit diagram of a power supply part in accordance with one embodiment of the invention.

As shown in FIG. 2, the power supply part receives a +24 V power which is supplied by the motor control unit or by the external. The power supply part is adapted to convert the +24 VDC power supplied from outside into a +12 VDC power, a +5 VDC power, and a +3.3 VDC power and supply the powers to other parts of the Bluetooth communication unit, respectively.

Figure 3:
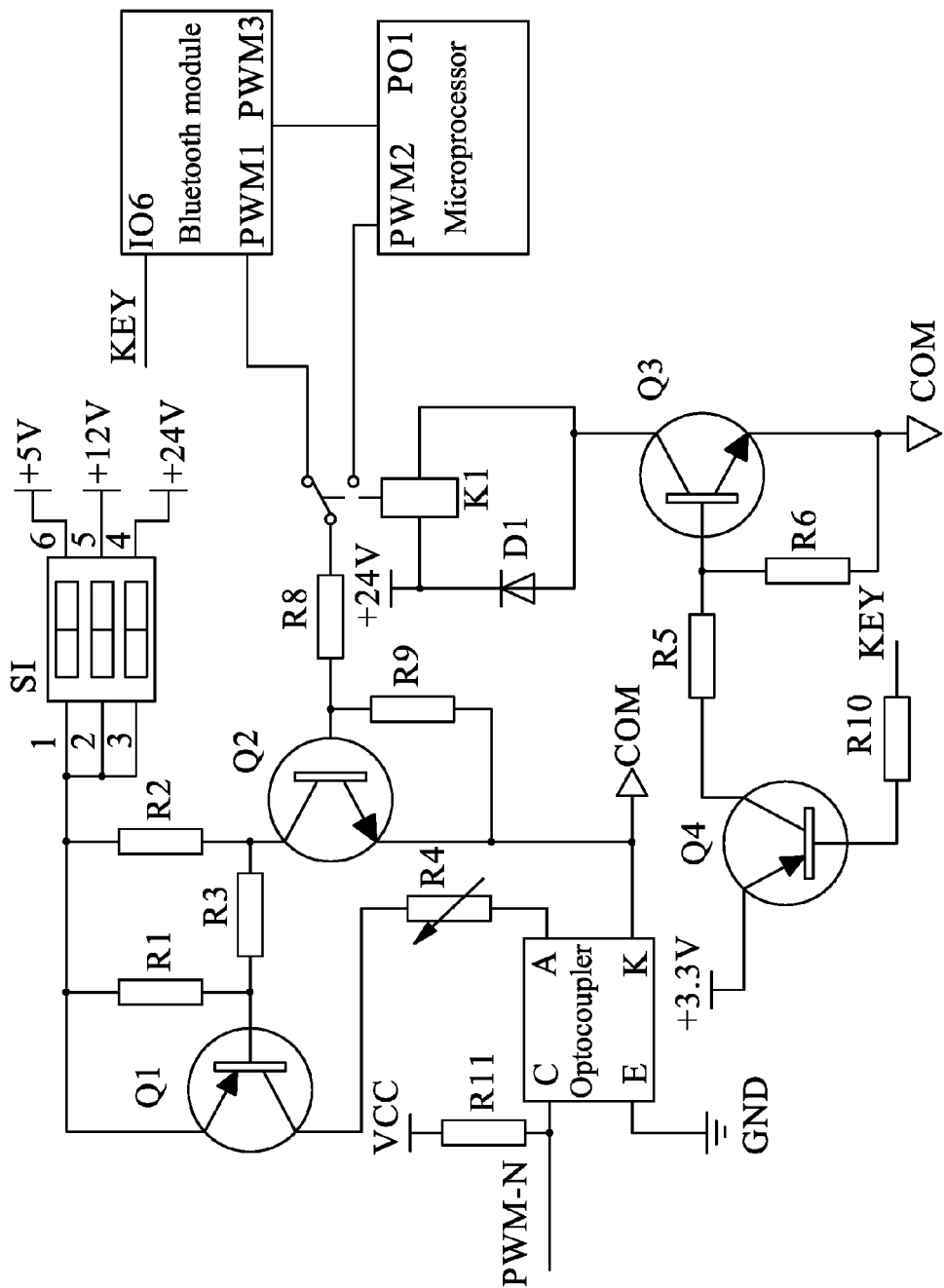
FIG. 3 is a circuit diagram of a PWM output control module in accordance with one embodiment of the invention.

As shown in FIGS. 1-3, the Bluetooth communication unit further comprises: a microprocessor, and a PWM output control module. The microprocessor and the Bluetooth module are connected and communicate with each other. The microprocessor and the Bluetooth module each operate to output one path of independent PWM signal, respectively. One path of the independent PWM signal is selected and output to the interface circuit via the PWM output control module, and then sent to the motor control unit via the interface circuit. The PWM output control module comprises: a driving circuit and a switch. When the driving circuit is in the absence of a driving signal input, the PWM output control module outputs the PWM signal from the Bluetooth module; and when the driving circuit is input with the driving signal, the driving circuit drives the switch to operate so as to drive the PWM output control module to output the PWM signal from the microprocessor. Duty ratios of both the PWM signal output from the Bluetooth module and the PWM signal output from the microprocessor are adjustable. Besides, a frequency range of the PWM signal output from the Bluetooth module is smaller than a frequency range of the PWM signal output from the microprocessor. A frequency of the PWM signal output from the Bluetooth module is adjustable. The switch adopts a single pole double throw (SPDT) relay. But the selection of the switch is not limited to the SPDT relay, and other relay switches adapted to realize the switch of outputting different PWM signals are also operable.

As shown in FIG. 3, when the frequency of the PWM signal required by the motor control unit is between 60 Hz and 8 KHz, there is no need to input the driving signal into the driving circuit. Thus, the driving circuit is not conducted, the relay K1 is maintained at an original connecting position, and the PWM output control module outputs a default PWM signal from the Bluetooth module. A PWM1 port of the Bluetooth module outputs the default PWM signal, which is then input into the motor control unit via the PWM output control module and the interface circuit. Or the duty ratio and the frequency of the PWM signal are firstly adjusted by the Bluetooth module, then the PWM signal is output by the PWM1 port of the Bluetooth module and finally input into the motor control unit via the PWM output control module and the interface circuit.

When the frequency of the PWM signal required by the motor control unit is not between 60 Hz and 8 KHz, application program in a smart phone or other smart mobile devices is used to connect the Bluetooth module, after the connection is successfully established, a low level is written into a pin 106 of the Bluetooth module and input into the driving circuit. When the driving circuit receives the driving signal, Q3 and Q4 in the driving circuit are connected, the relay K1 is switched to another connecting position, and the PWM output control module outputs the PWM signal from the microprocessor. The duty ratios of the PWM signal is adjustable via the Bluetooth module before being output via a PWM3 port of the Bluetooth module. The PWM signal is then input into the motor control unit via the microprocessor, the PWM output control module, and the interface circuit, respectively.

The PWM output control module further comprises a dial switch S1 operating to select a level voltage of the PWM signal output by the PWM output control mode, and the level voltage of the PWM signal can be selected as 5 V, 12 V, or 24 V.

Figure 4:
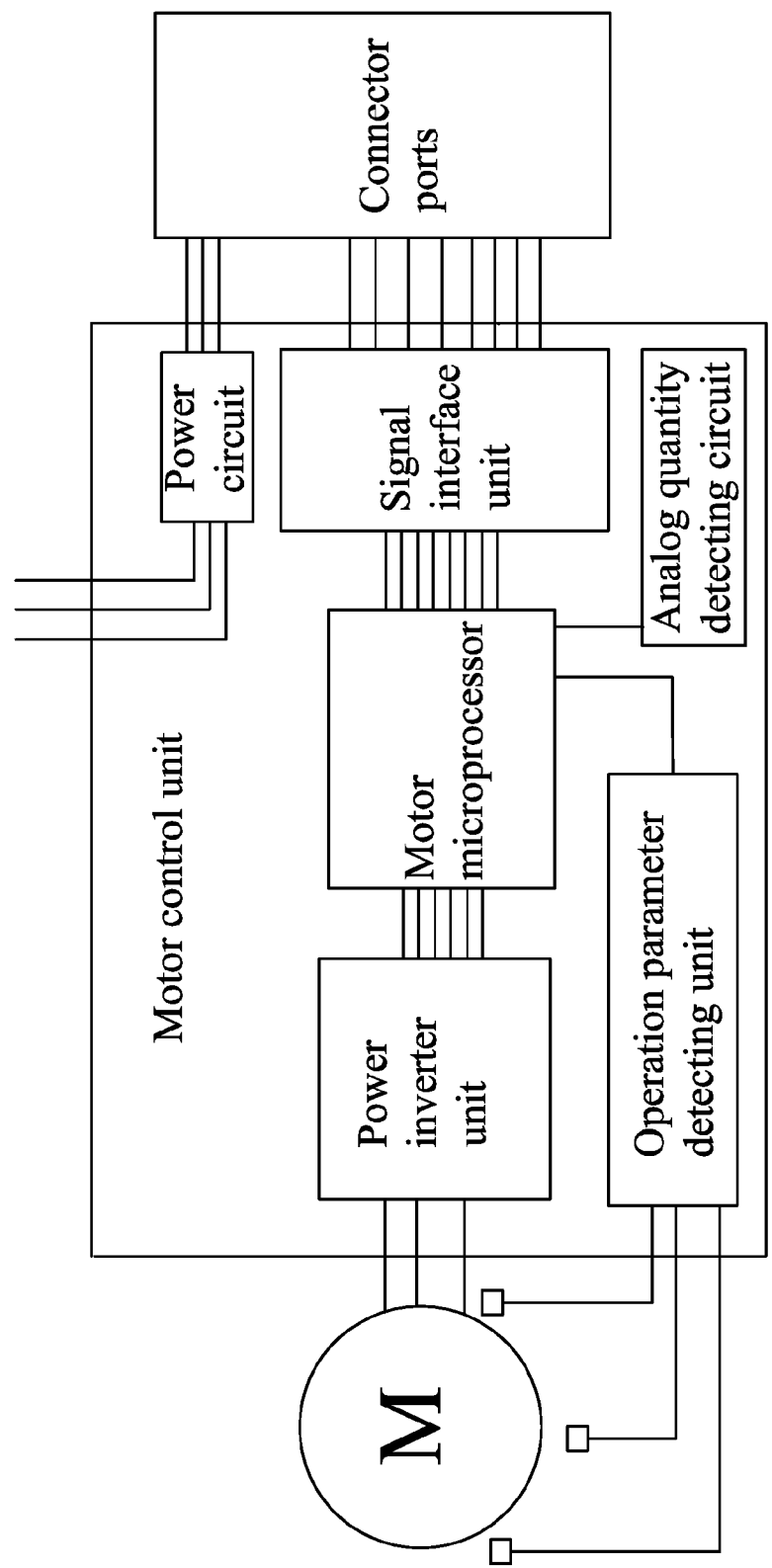
FIG. 4 is a schematic diagram of a motor control unit in accordance with one embodiment of the invention.

As shown in FIG. 4, the motor control unit comprises: a power circuit, a motor microprocessor, an operation parameter detecting unit, and a power inverter circuit. The power circuit supplies power for other circuits, the operation parameter detecting unit detects operation parameters of the motor and inputs the detected operation parameters into the motor microprocessor. The motor microprocessor controls the motor to operate via the power inverter unit. The motor control unit further comprises a signal interface unit. The motor microprocessor and the interface circuit of the Bluetooth communication unit are connected and communicate with each other via the signal interface unit so as to establish a communication connection between the motor microprocessor and the external via the Bluetooth module.

Figure 5:
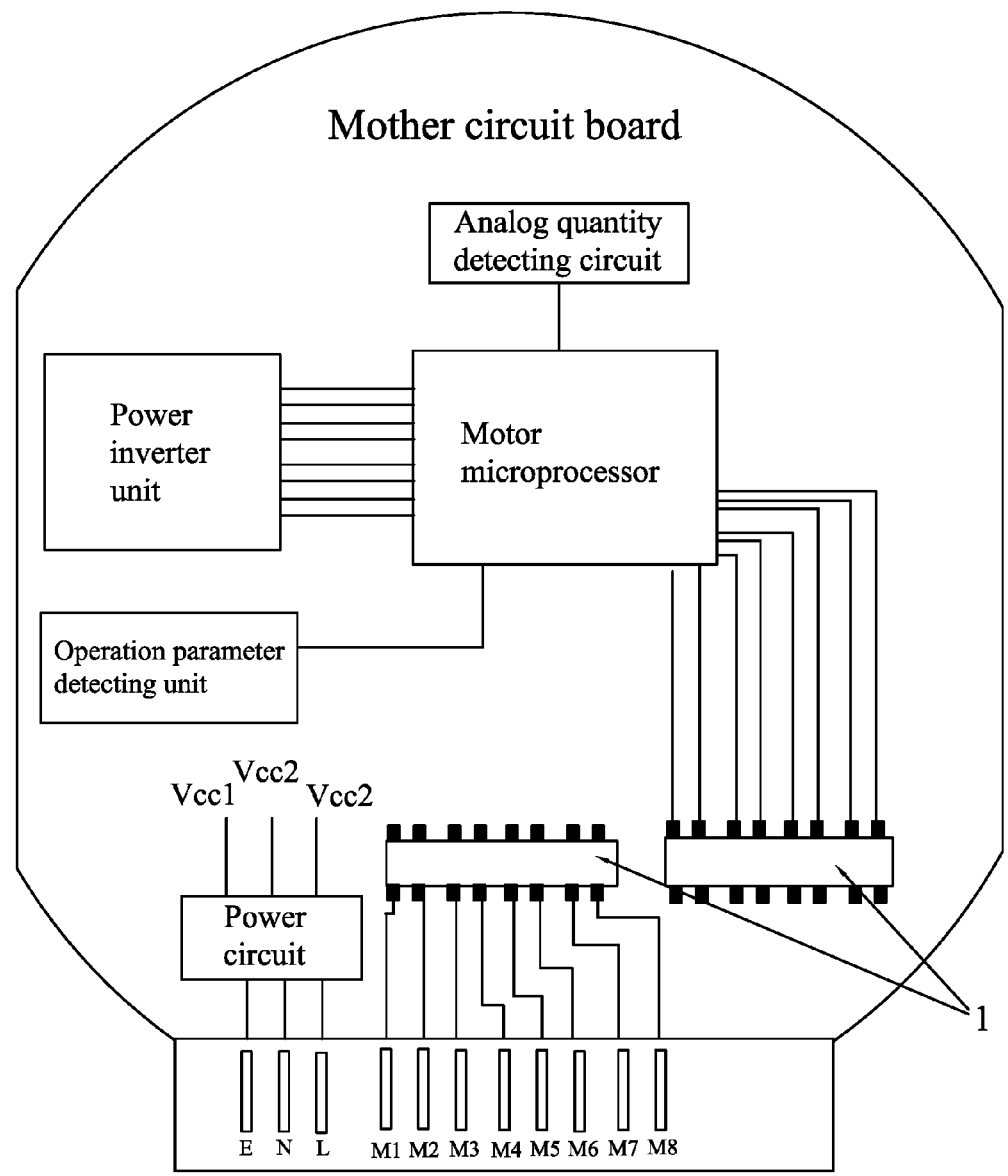
FIG. 5 is a structure diagram of a mother circuit board in accordance with one embodiment of the invention.
Figure 6:
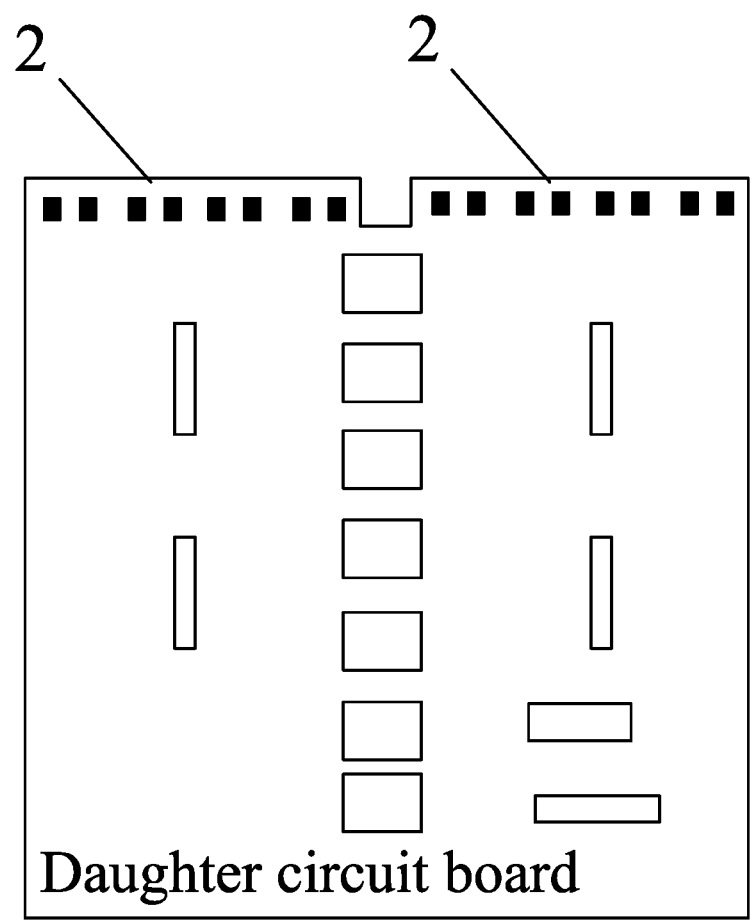
FIG. 6 is a structure diagram of a daughter circuit board in accordance with one embodiment of the invention.

As shown in FIGS. 5-6, the Bluetooth communication unit and the motor control unit are integrated on different circuit boards, in which, the Bluetooth communication unit is integrated on a daughter circuit board, the motor control unit is integrated on a mother circuit board. Both the mother circuit board and the daughter circuit board are installed inside the motor controller. The mother circuit board is configured with a slot 1, and the daughter circuit board is configured with a plug 2, and the plug 2 is nested within the slot 1 to allow the daughter circuit board and the mother circuit board to form electric connection. The interface circuit comprises a plurality of connector ports for connecting the interface circuit to the signal interface unit of the motor control unit. The connector ports comprise: a +5 V port, an RXD_M port, a TXD_M port, a GND port, a PWM_IN port, and an NTC port. The +24 V port is adapted to provide the +24 VDC power for the motor control unit. The PXD_M port and the TXD_M port are adapted to establish serial communication between the interface circuit and the signal interface unit. The PWM_IN port is adapted to input the PWM signal into the motor control unit from the interface circuit. The NTC port is adapted to transmit a temperature signal detected by a thermistor to the Bluetooth module, and the Bluetooth module then transmits the temperature signal to a smart terminal.

Figure 7:
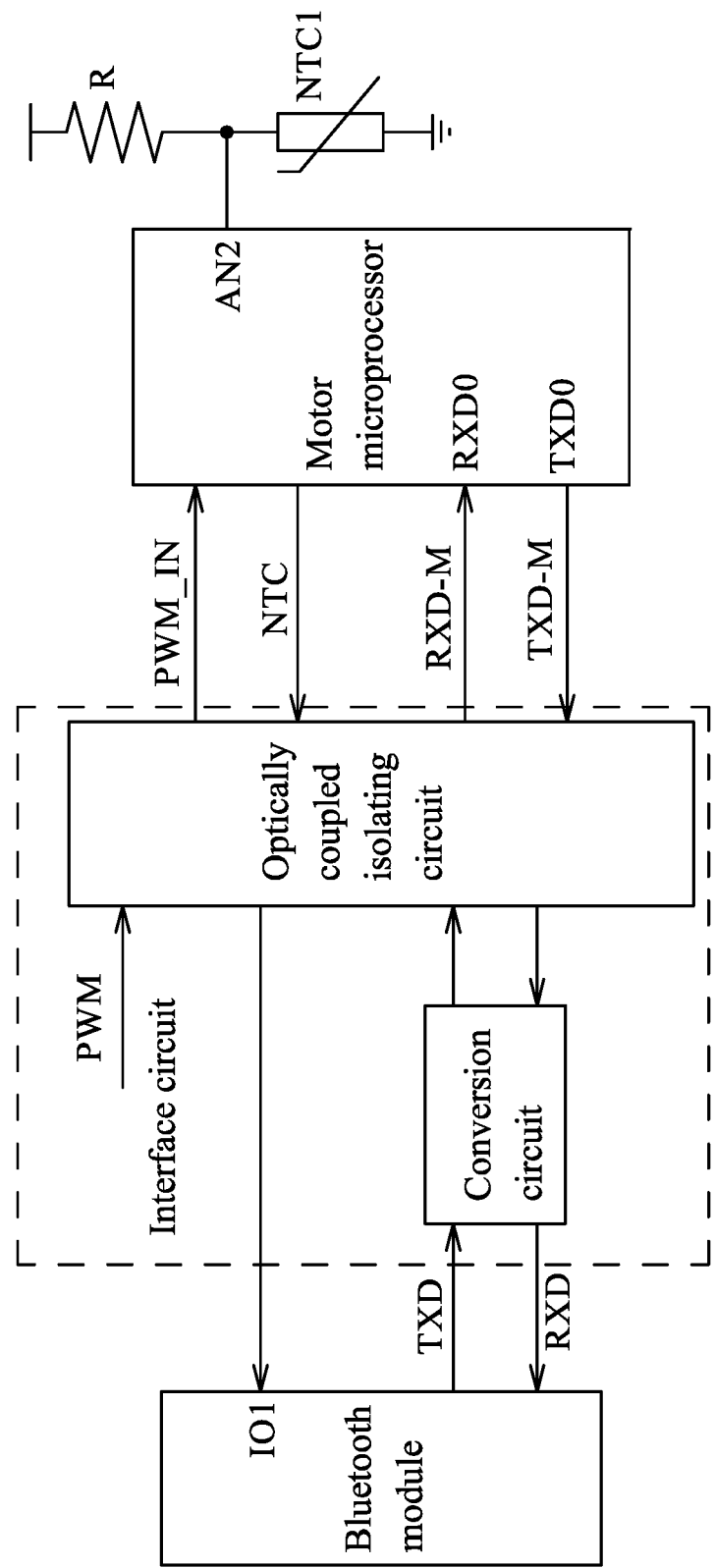
FIG. 7 is a schematic diagram illustrating connection among a Bluetooth module, an interface circuit, and a motor microprocessor in accordance with one embodiment of the invention.
Figure 8:
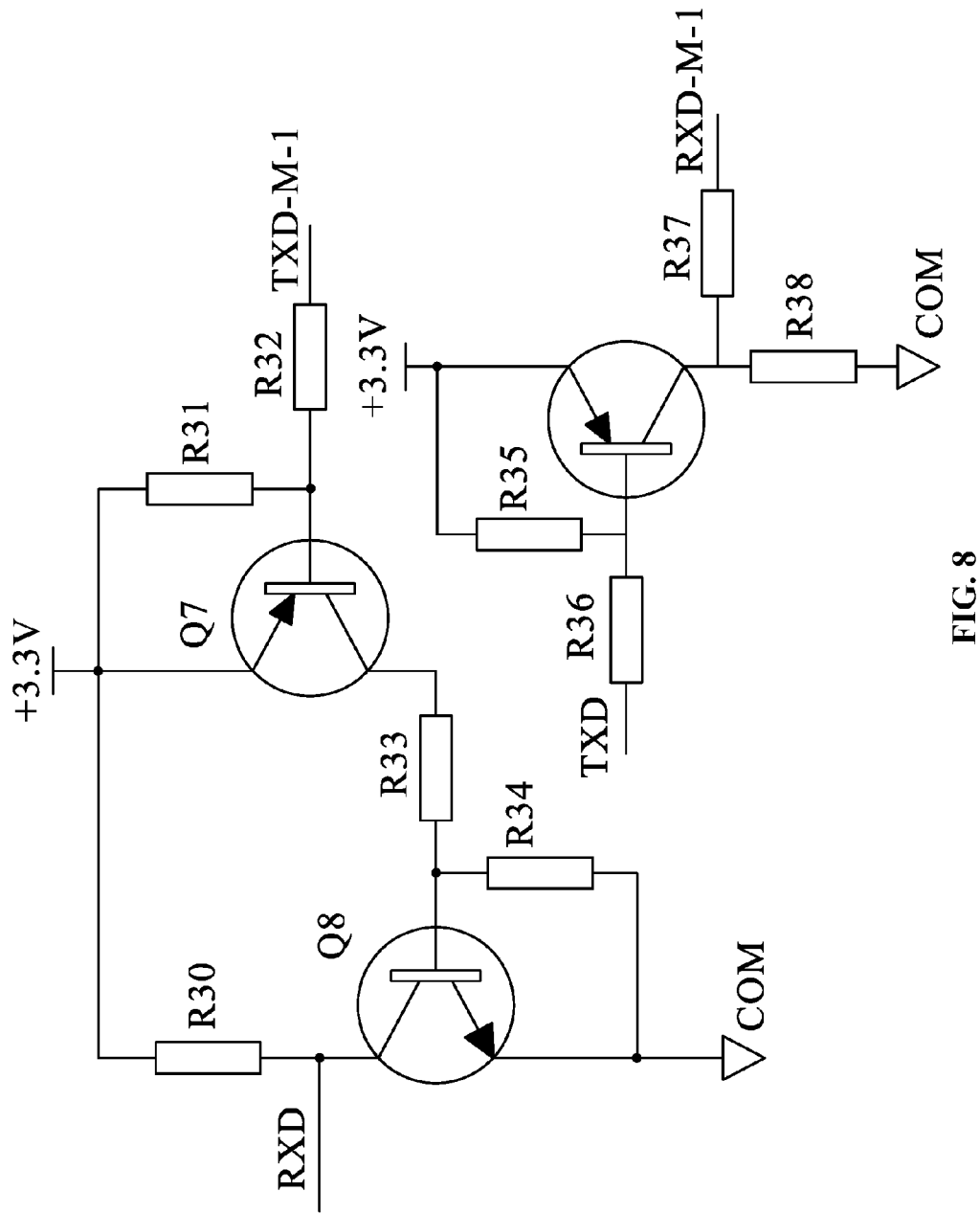
FIG. 8 is a circuit diagram of a conversion circuit in accordance with one embodiment of the invention.

As shown in FIG. 7, the interface circuit comprises an optically coupled isolating circuit and a switching circuit, through which the communication connection between the Bluetooth module and the motor microprocessor are realized. The thermistor NTC1 is disposed inside the motor controller, and the resistance of the thermistor NTC1 itself changes along with the variation of the inner temperature of the motor controller, and is finally reflected on variation of the analog voltage. The analog voltage is input into a pin AN2 of the motor microprocessor, and is converted into a digital voltage by an A/D conversion circuit of the motor microprocessor. The digital voltage is input into the pin IO1 of the Bluetooth module via the optically coupled isolating circuit. Then the Bluetooth module transmits the changed digital voltage to the application program installed in the smart terminal so as to enable the application program to utilize and process the digital voltage, thus displaying of the real-time temperature inside the motor controller on the smart terminal. Specific structure of the conversion circuit is shown in FIG. 8, and the conversion circuit is adapted to provide sufficient driving circuit for the optically coupled isolating circuit so as to ensure the normal operation of the optically coupled isolating circuit.

Besides, the Bluetooth communication unit and the motor control unit can be integrated on a circuit board, and the circuit structure and the working principle are the same as that described in the above, thus not repeated herein.

Example 2

Figure 9:
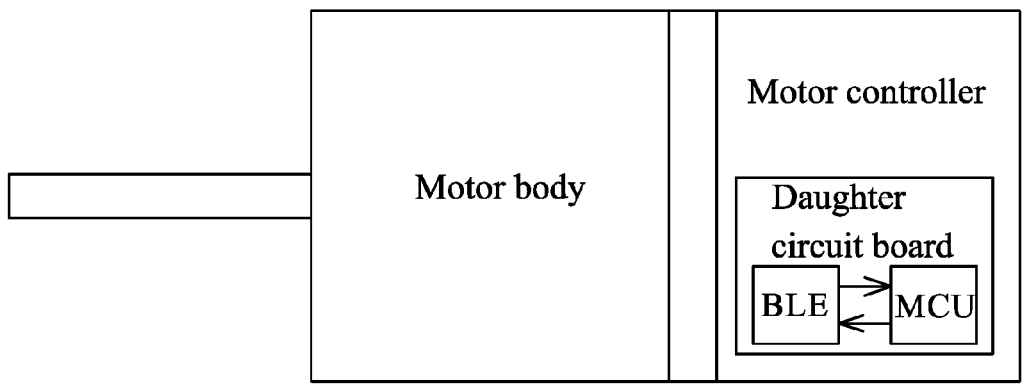
FIG. 9 is a structure diagram of a brushless DC motor in Example 2.

As shown in FIG. 9, a brushless DC motor comprises a motor body and a motor controller. The motor controller controls the motor body to operate, and the motor controller is specifically described in Example 1.

Example 3

Figure 10:
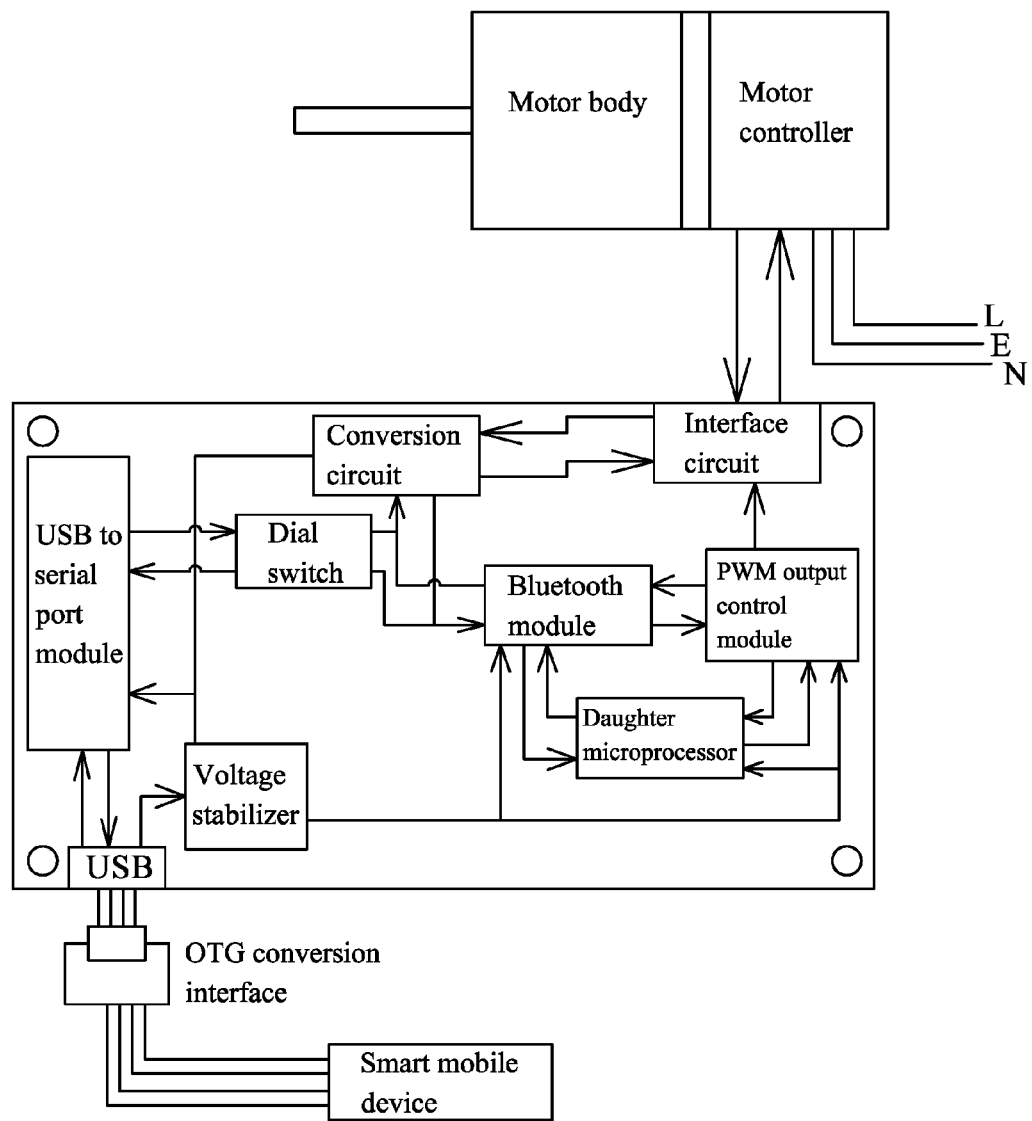
FIG. 10 is a first structure diagram of a brushless DC motor in Example 3.
Figure 11:
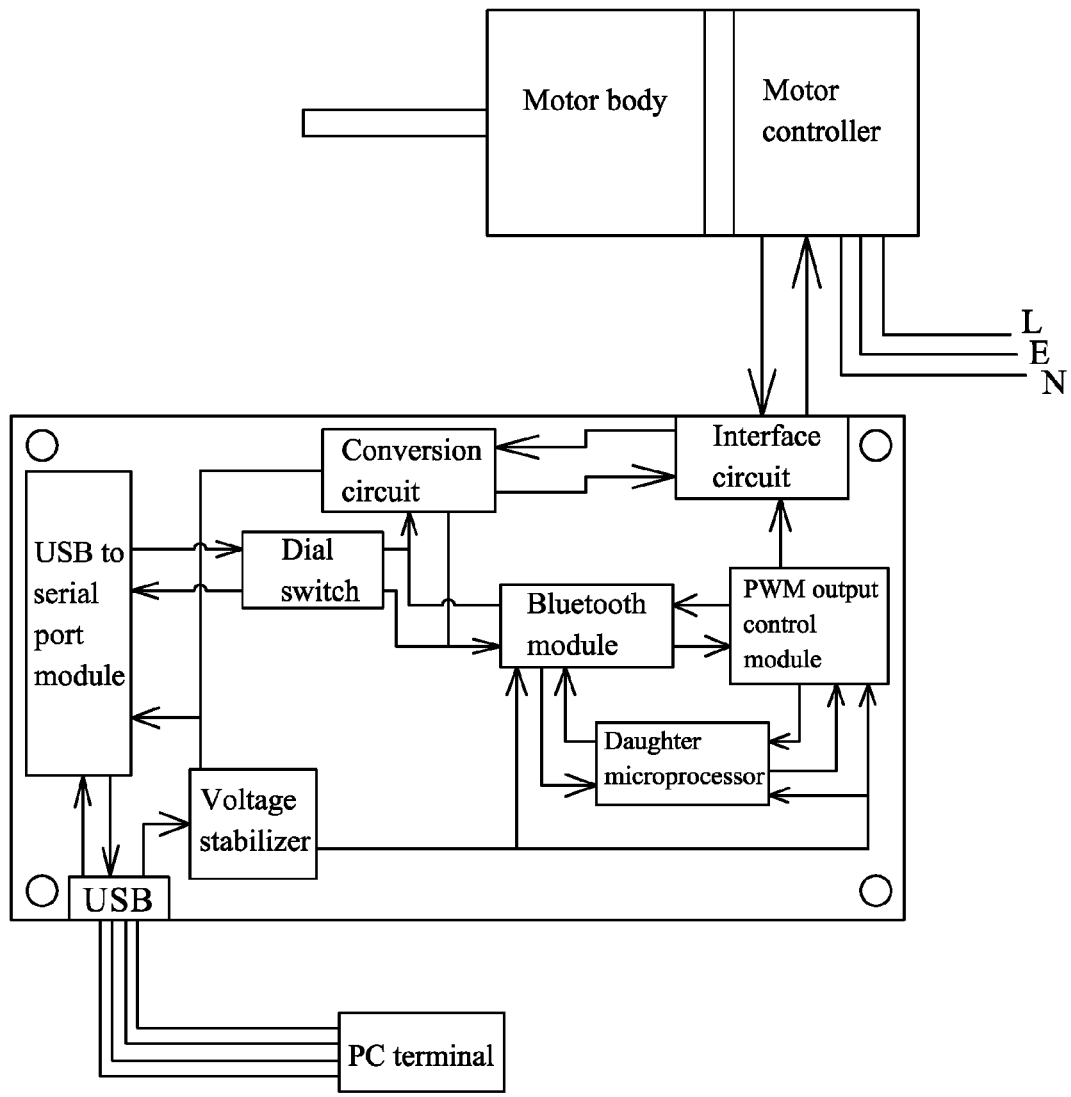
FIG. 11 is a second structure diagram of a brushless DC motor in Example 3.

As shown in FIGS. 10-11, a brushless DC motor comprises a motor body and a motor controller. The structure of the brushless DC motor is the same as that of Example 2 except that the daughter circuit board is separated from the motor controller and is individually designed to be a communication board operating to communicate with the brushless DC motor, whereas an inner structure of the daughter circuit board is basically the same as that of Example 1 except that the daughter circuit further comprises: a USB to serial port module, a USB interface, and a low dropout voltage stabilizer. The USB to serial port module is connected to the Bluetooth module, and both the USB to serial port module and the low dropout voltage stabilizer are connected to the USB interface. The USB interface is connected to the external smart mobile device or an external PC terminal via the USB interface.

As shown in FIG. 10, the external smart mobile device is smart phones or other mobile devices in support of Bluetooth 4.0. The external smart mobile device is adapted to connect the USB interface via an OTG conversion line. After the connection, the external smart mobile device is capable of supplying power to other circuits of the daughter circuit board via the USB interface and the low dropout voltage stabilizer, as well as establishing communication connection with the Bluetooth module of the motor controller via the self-equipped Bluetooth.

As shown in FIG. 11, the PC terminal can be directly connected to the USB interface. After the connection, the PC terminal is able to supply power to the circuits of the daughter circuit board via the USB interface and the low dropout voltage stabilizer, as well as establish the communication connection with the Bluetooth module via the USB interface and the USB to serial port module. By the PC terminal, control parameters can be input into the Bluetooth module or a feedback signal output from the Bluetooth module can be received.

Preferably, the low dropout voltage stabilizer LM1086-3.3 primarily operates to stably provide +3.3 VDC power to other circuits of the daughter circuit board and to reduce the influence of the voltage fluctuation on other circuits. Power is supplied to the daughter circuit board via the external smart mobile device or the external PC terminal, thus no additional power is required, and the use thereof is much convenient.

Besides, a dial switch is configured between the USB to serial port module and the Bluetooth module. In communication between the Bluetooth module and the conversion circuit, the dial switch is able to disconnect the connection between the USB to serial port module and the Bluetooth module, so as to reduce the interference of the USB to serial port module on the communication between the Bluetooth module and the conversion circuit. When the external smart mobile device or the PC terminal is in communication connection with the USB interface, the dial switch is able to connect the USB to serial port module to the Bluetooth module.

Example 4

Figure 12:
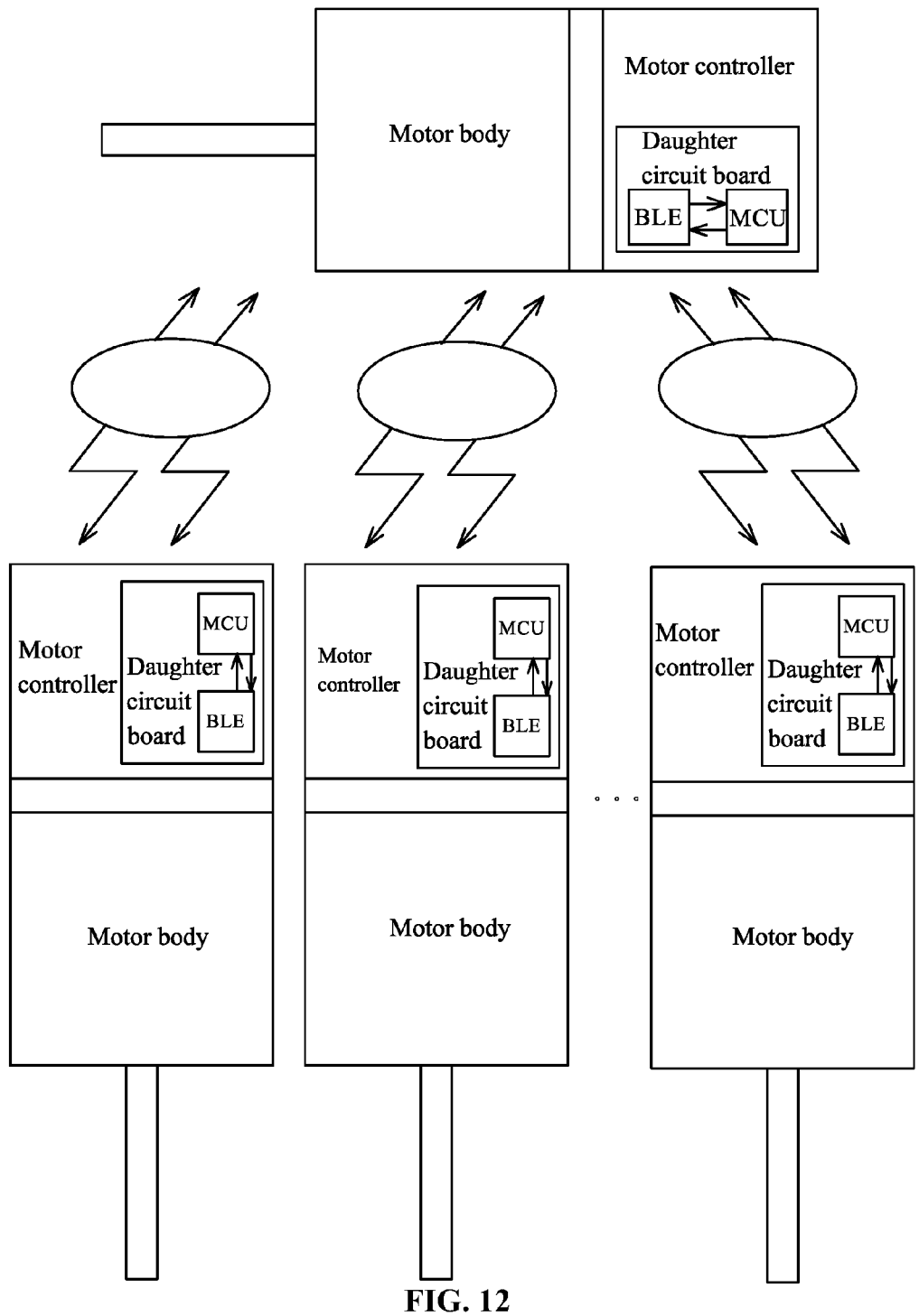
FIG. 12 is a structure diagram of a multi-motor system in Example 4.

As shown in FIG. 12, a multi-motor system comprises multiple brushless DC motor as described in Example 2 or Example 3, and the multiple brushless DC motor establish communication connection with one another via Bluetooth communication units.

One of the multiple brushless DC motor is adopted as a main engine, and other brushless DC motor are adopted as auxiliary engines. The Bluetooth communication unit of the main engine serves as a main transparent transmission module, and the Bluetooth communication units in the auxiliary engines serves as auxiliary transparent transmission modules. Both the main engine and the auxiliary engines have separate ID numbers as their unique identifiers. When one of the auxiliary engines fails to function, the auxiliary transparent transmission module of the auxiliary engine preferably communicates with the main transparent transmission module of the main engine and sends data to the main transparent transmission module of the main engine. Then the main engine takes corresponding operations according to the data and sends a control command to the auxiliary engine for realizing the effective control. Thus, the labor intensity and the labor cost for technicians to examine the failed motor are greatly reduced.

Example 5

Figure 13:
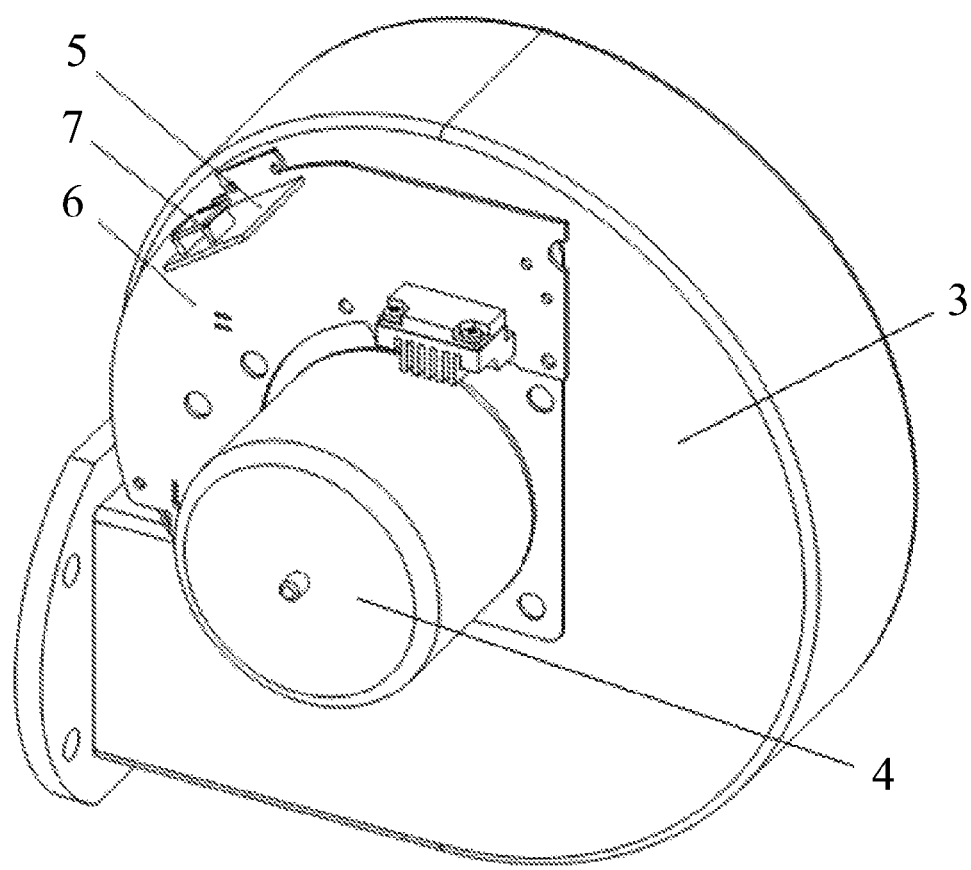
FIG. 13 is a structure diagram of a blower system in Example 5.

As shown in FIG. 13, a blower system comprises a blower 3 and a brushless DC motor as described in Example 2. The brushless DC motor 4 is installed on the blower 3. The Bluetooth communication unit 5 is installed on the motor control unit 6, and the Bluetooth communication unit 5 is configured with a Bluetooth module 7.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A motor controller, comprising:
a) a Bluetooth communication unit, the Bluetooth communication unit comprising: a power supply part, a Bluetooth module, an interface circuit, a microprocessor, and a Pulse Width Modulation (PWM) output control module; and
b) a motor control unit, the motor control unit comprising an input port of a rotational speed adjusting signal;
wherein
the power supply part supplies power to the Bluetooth module and the interface circuit;
the motor control unit communicates with an external device via the Bluetooth module;
the microprocessor and the Bluetooth module are connected to and communicate with each other;
the PWM output control module is connected to the microprocessor and the Bluetooth module;
the microprocessor is adapted to output a first PWM signal, and the Bluetooth module is adapted to output a second PWM signal;
the first PWM signal is in a first frequency range, and the second PWM signal is in a second frequency range, and the first and second frequency ranges are not overlapped with each other; and
the PWM output control module is adapted to select one PWM signal from the first and second PWM signals and then send the one PWM signal to the input port of the rotational speed adjusting signal via the interface circuit, according to the requirement of a user, wherein the one PWM signal determines the rotational speed of the motor.

2. The motor controller of claim 1, wherein
the PWM output control module comprises: a driving circuit and a switch;
when the driving circuit is in the absence of a driving signal input, the PWM output control module outputs the first PWM signal from the Bluetooth module; and
when the driving circuit is input with a driving signal, the driving circuit drives the switch to operate so as to drive the PWM output control module to output the second PWM signal from the microprocessor.

3. The motor controller of claim 1, wherein
duty ratios of the first PWM signal output from the Bluetooth module and the second PWM signal output from the microprocessor are adjustable.

4. The motor controller of claim 3, wherein
a frequency range of the first PWM signal output from the Bluetooth module is smaller than a frequency range of the second PWM signal output from the microprocessor; and
a frequency of the first PWM signal output from the Bluetooth module is adjustable.

5. The motor controller of claim 2, wherein the switch adopts a relay.

6. The motor controller of claim 1, wherein the PWM output control module further comprises a dial switch operating to select a level voltage of the one PWM signal output by the PWM output control module.

7. The motor controller of claim 1, wherein the power supply part is adapted to convert a +24 VDC power supplied from outside into a +12 VDC power, a +5 VDC power, and a +3.3 VDC power and supply the powers to other parts of the Bluetooth communication unit, respectively.

8. The motor controller of claim 1, wherein
the motor control unit comprises: a power circuit, a motor microprocessor, an operation parameter detecting unit, and a power inverter circuit;
the power circuit supplies power for other circuits, the operation parameter detecting unit detects operation parameters of the motor and inputs the detected operation parameters into the motor microprocessor; and
the motor microprocessor controls the motor to operate via the power inverter unit.

9. The motor controller of claim 8, wherein
the motor control unit further comprises a signal interface unit;
the motor microprocessor and the interface circuit of the Bluetooth communication unit are connected and communicate with each other via the signal interface unit so as to establish a communication connection between the motor microprocessor and the external device via the Bluetooth module.

10. The motor controller of claim 9, wherein
the interface circuit comprises a plurality of connector ports for connecting the interface circuit to the signal interface unit of the motor control unit; and
the connector ports comprise: a +5 V port, an RXD_M port, a TXD_M port, a GND port, a PWM_IN port, and an NTC port.

11. The motor controller of claim 10, wherein
a thermistor is disposed in the motor controller for transmitting a detected temperature signal to the motor microprocessor;
the temperature signal is processed and converted by the motor microprocessor and then input into the Bluetooth module via the interface circuit, and the temperature signal is then sent to an external smart mobile device.

12. The motor controller of claim 1, wherein the Bluetooth communication unit and the motor control unit are integrated on a circuit board.

13. The motor controller of claim 1, wherein the Bluetooth communication unit and the motor control unit are integrated on different circuit boards, in which, the Bluetooth communication unit is integrated on a daughter circuit board, the motor control unit is integrated on a mother circuit board, and the daughter circuit board and the mother circuit board are connected and communicate with each other.

14. The motor controller of claim 13, wherein
the daughter circuit board further comprises a USB to serial port module and a USB interface; and
the USB to serial port module is connected to the Bluetooth module and is connected to an external smart mobile device or an external PC terminal via the USB interface.

15. The motor controller of claim 14, wherein
the daughter circuit board further comprises a voltage stabilizer; the voltage stabilizer is connected to the USB interface; and
the external smart mobile device or the external PC terminal is adapted to supply power to other circuits of the daughter circuit board via the USB interface and the voltage stabilizer.

16. A brushless direct current motor comprising the motor controller of claim 1.

17. The motor of claim 16, wherein
the PWM output control module comprises: a driving circuit and a switch;

when the driving circuit is in the absence of a driving signal input, the PWM output control module outputs the first PWM signal from the Bluetooth module; and when the driving circuit is input with a driving signal, the driving circuit drives the switch to operate so as to drive the PWM output control module to output the second PWM signal from the microprocessor.

18. The motor of claim 16, wherein the motor control unit comprises: a power circuit, a motor microprocessor, an operation parameter detecting unit, and a power inverter circuit;

the power circuit supplies power for other circuits, the operation parameter detecting unit detects operation parameters of the motor and inputs the detected operation parameters into the motor microprocessor; and the motor microprocessor controls the motor to operate via the power inverter unit.

19. The motor of claim 18, wherein the motor control unit further comprises a signal interface unit;

the motor microprocessor and the interface circuit of the Bluetooth communication unit are connected and communicate with each other via the signal interface unit so as to establish a communication connection between the motor microprocessor and the external device via the Bluetooth module.

20. The motor of claim 19, wherein the interface circuit comprises a plurality of connector ports for connecting the interface circuit to the signal interface unit of the motor control unit; and the connector ports comprise: a +5 V port, an RXD_M port, a TXD_M port, a GND port, a PWM_IN port, and an NTC port.

21. A multi-motor system comprising a plurality of the brushless direct current motors of claim 16, wherein the brushless direct current motors communicate with each other via Bluetooth communication units.

* * * * *